United States Patent Office 3,056,427
Patented Oct. 2, 1962

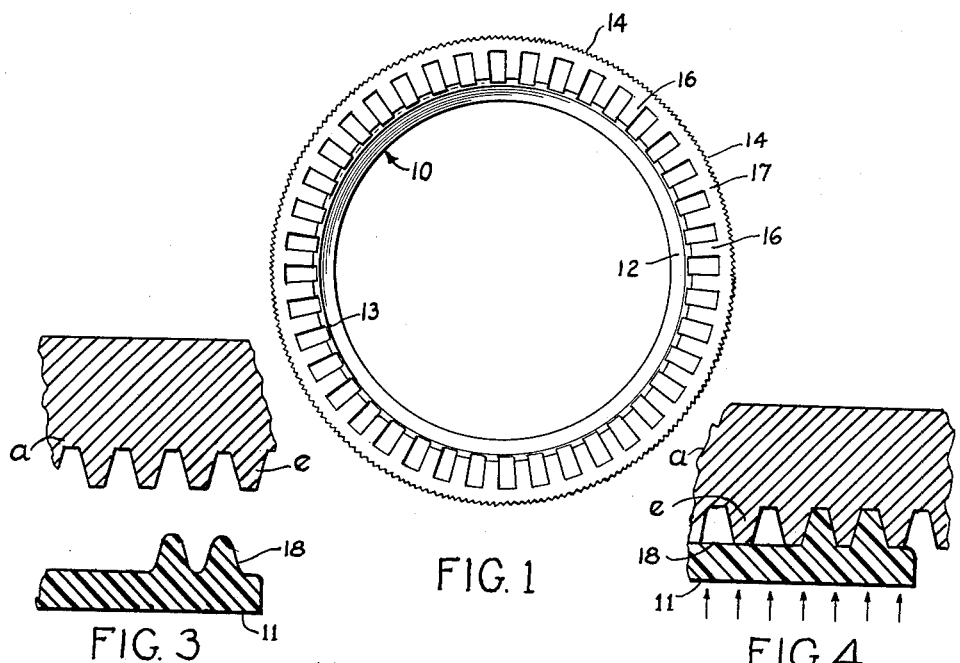
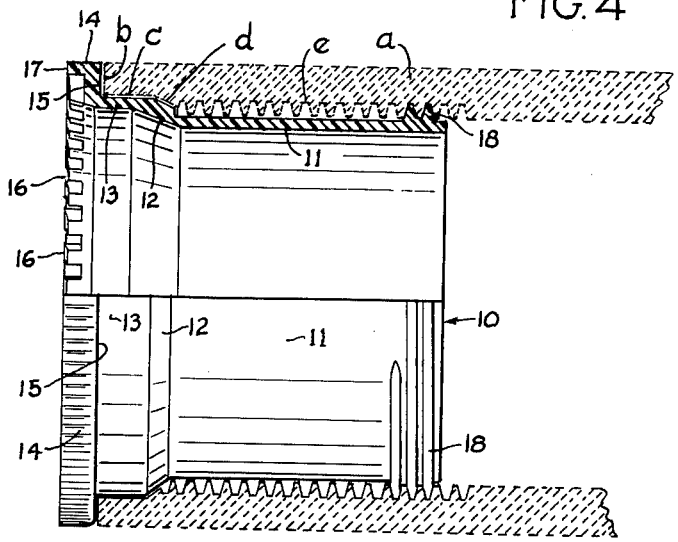

3,056,427
IMPACT ABSORBING PROTECTOR FOR INTERNALLY THREADED PIPE ENDS
Edward F. Higgins, 23 Orchard Lane, Kirkwood 22, Mo.
Filed Oct. 14, 1959, Ser. No. 846,511
3 Claims. (Cl. 138—96)

This invention relates to impact-absorbing protectors for the ends of pipes, and particularly to threaded steel pipe several inches in diameter, such as is commonly used in the oil well industry. Such pipe is subjected to severe impacts. If their ends are knocked out of round, or their threads damaged or distorted, their utility will be lost. Its teachings have special application to the protectors for internally threaded pipe ends; and this application is a continuation in part of my presently pending application Serial No. 618,725 now abandoned entitled "Plastic Protector for Internally Threaded Pipe Ends," filed October 29, 1956.

While the protector structure herein provided is specifically different from the structure shown in my copending application Serial No. 630,864 now Patent No. 2,989,087 entitled "Plastic Protector for Externally Threaded Pipe Ends" filed December 27, 1956, that application discloses for the first time certain new teachings in the art of absorbing impact loads by the flow of heat-softenable plastic material, and specifically related to the problem how to confine its flow to avoid shearing through the material. To the extent such disclosure is also made and used herein, this application is a continuation in part of said application Serial No. 630,864, now Patent No. 2,989,087.

Each of the so-called "thread protectors" heretofore used or suggested for pipe ends falls into one of two entirely separate groups:

(1) Rugged steel rings designed to protect the ends from being knocked out of round under extreme impacts; or (2) Soft non-metallic end covering or thread-covering seals to exclude dirt and moisture. These may inherently possess some small ability to protect the pipe threads from light impacts; but are utterly incapable of protecting the pipe ends from such extreme impacts as would be encountered, say, in rolling off a flat car.

For this first type of use, only steel ring protectors have heretofore been used in the oil fields.

A principal purpose of the present invention is to provide a protector which protects against such extreme impacts even more effectively than the steel protectors heretofore in use. Other objects of the present invention include:

Providing a pipe end protector which actually absorbs energy, rather than transmits it to a pipe itself; affording fluid-tight protection to the pipe ends, including each end surface and substantially the entire threaded area; and putting to use the thermo-plastic deformability of the polyethylene material to flow not under heat but under impact loads at ordinary service temperatures. A further purpose is to provide an impact protector which, unlike steel protectors now in use, excludes dirt and moisture. Other objects will be apparent hereinafter.

In the accompanying drawings:

FIGURE 1 is an end view of a molded polyethylene protector for internally threaded pipe ends, embodying the present invention.

FIGURE 2 is a side view, the upper half being in section and the lower half in elevation, of the protector of FIGURE 1 applied to the end of an internally threaded pipe, shown in dashed lines.

FIGURES 3 and 4 are schematic presentations showing how the rounded threads of the molded plastic protector are elastically deformed to seal against the pipe threads.

The energy-absorbing, permanent thermoplastic deformation which the polyethylene material undergoes under impact is not readily illustrated because its extent depends upon the precise area and direction of impact. Therefore no attempt has been made to illustrate a protector which has been so permanently deformed.

The internal thread protector shown in FIGURES 1 and 2 is generally designated 10 and is molded of polyethylene. Use of the denser polyethylenes is advantageous here; density should be about 0.96 gram per cubic centimeter and crystallinity should be 90% or greater as compared with the approximate 65% crystallinity found in ordinary molding grades of polyethylene. The denser material is characterized by a higher softening temperature as well as greater strength. Some heat distortion may be noted as low as 165° F. but such material will not soften, in the commercial sense, until a temperature of 260° F. is reached.

The protector is molded integrally and comprises a cylindrical sleeve portion 11 which extends axially inward approximately the entire depth of the threaded portion of a pipe designated $a$ which has an end surface $b$, a shallow end counterbore $c$, a short taper portion $d$ next adjacent and leading to the inner diameter of the pipe, and modified V-type internal threads $e$ therein.

Conforming to and adapted to fit within pipe $a$, the protector 10 has a sleeve portion 11 which extends over substantially the full area of the internal pipe threads $e$. Outwardly adjacent the sleeve portion 11, the protector has a taper portion 12 adapted to seat and bear against the pipe taper portion $d$; thence a short broadened or enlarged-diameter cylindrical portion 13; and (immediately outward of the pipe end surface $b$) a knurled cuff or flange portion 14 having an annular flange surface 15 adjacent the pipe end surface $b$; and a plurality of axially outward-extending fins 16 arranged radially, to terminate in a rim 17 whose outer diameter approximately equals the outer diameter of the pipe $a$.

Adjacent the axially inner end of the sleeve portion 11 there is molded on its outer side an external rounded thread 18 which has a length of more than one turn and, as shown in FIGURE 2, preferably about 2¼ turns. The rounded form of the thread 18, shown enlarged in the fragmentary view FIGURE 3, is much like that used for molding threads in glass or rolling threads on metal. The cross-sectional area of the thread 18 is equal to the area between adjacent pipe threads $e$, so that when the protector thread 18 deforms it will pack against and seal the pipe threads $e$, as in FIGURE 4.

The short thread length permits easy removal from the mold; also it allows the protector 10 to be axially slidably inserted within the pipe $a$ by a sharp blow endwise followed by a slight twist to seat the thread 18 and to bring the flange surface 15 sealedly against the pipe end surface $b$. The rim 17, reinforced by the fins 16, strengthens the cuff 14 to prevent inward bending accompanying such tension. When the protector 10 is applied, the taper portion 12 seats against the pipe taper portion $d$ as the pipe end surface b is sealed by the annular flange surface 15.

The diameter of the sleeve portion 11 is such as to fit snugly within the minor diameter of the internal threads e of the pipe a, without binding. The inner end of the sleeve portion 11 which bears the thread 18 cannot be compressed radially inward without setting up strong restoring forces directed radially outward and represented by the arrows in FIGURE 4. These restoring forces deform the thread 18 from its rounded shape shown in FIGURE 3 into sealing engagement with the modified V-type configuration of the pipe threads e. The tight spiral seal thus established excludes dirt and moisture much in the manner of an O-ring seal. Since the thread 18 snaps in place, without screwing it through the threaded portion e of the pipe, the material is not worn away when the protector is applied; hence the seal is reliable. The low cost of the protector makes it dispensable after single use; although I have found the wear on removal is so little as to permit a limited amount of re-use.

If a high impact load is applied axially (that is, endwise) to the protector 10, as by dropping the pipe a endwise, the protector 10 actually absorbs and dissipates much of the energy of such load effectively by means of the fins 16 and rim 17. Since they project axially from the cuff 14, on impact they will first bulge sidewards; and as the material is stressed beyond its yield point, they will yield and flow plastically, much as if they were heated by a direct source of heat energy rather than by the kinetic energy of impact. The fins 16 and rim 17 will thus suffer a permanent "set" or deformation. The energy required to cause them to so permanently deform by plastic flow, reduces the load applied to the pipe; and its surface b and its threads e are thus protected from damage more effectively than would be possible with any other type of protector.

Impacts applied to a limited portion of the pipe end or having some sidewise component, present a greater danger than those which are evenly distributed and purely endwise. Using a steel protector, the concentration of such an impact has the result that the pipe end be knocked out of round, that threads be damaged, or that a protector be dislodged from the pipe end.

If such an impact load be applied to a portion only of the rim 17 and the fins 16 in the area of that portion, they will first deflect so as to spread the load over a somewhat greater area of application.

Continued deflection attendant stressing the material beyond its yield point results in internal heat which softens the material as if it were heated by an external source.

Some of the impact energy is, of course, transmitted to the pipe end; but that portion which results in deflection of the protector material is thus transformed into heat and is not transmitted to the pipe end. It appears that the relatively high softening temperature say 260° F. of the dense polyethylene chosen, permits a significant portion of the impact energy to be absorbed by this deflection-heating before the point of substantial fluidity is reached. However, this would not occur in the first place unless the protector design provided space for deflection.

Another requisite of protector design is that the softened, partly flowing material be not free to escape but that it be restrained to bear load in a somewhat hydraulic fashion. Like a fluid, the softened material possesses no amount of shear strength. If squeezed by the impact between an external object and between the pipe end and it were to escape, as by radial flow, the escaping portion would be sheared off.

The principal deflection of the material in radial fins 16 must be tangential, into the spaces between the fins. The rim 17 itself tends to restrict radially outward flow; the surface which applies such impact also tends to prevent radially outward flow and to drive the softened material of the rim 17 into the same inter-fin spaces.

To restrain the flow and in effect confine it, as mentioned in the second paragraph of this specification, the area of the inter-fin spaces, as viewed endwise in FIGURE 1, is less than the area of the impact-softenable material which may be driven therein, that is the material of the fins 16 and rim 17.

It is believed that never before has any material which is re-plasticized by heat been put to an impact-absorbing use in which the impact energy is transformed into heat energy. Nor is there any teaching in prior art what type of material, or what heat-softening temperature range would be effective for this purpose. Nor is there any suggestion of what specific design is necessary to avoid shearing off of heat-softened material.

Accordingly, the present invention should not be construed narrowly but as fully coextensive with the claims which follow.

I claim:

1. In combination with a metal pipe having an end including an outer diameter, an inner diameter, and an end surface, the improvement comprising an article for protecting the pipe end from deformation from impact as well as from dirt and moisture, the article being formed of plastic material characterized by thermoplastic deformability and comprising a tubular sleeve portion and a flange at the axially outer end thereof extending radially outward and presented adjacent to the pipe end surface and terminating in an axially projecting rim whose outer diameter equals that of the pipe, together further with fins spaced tangentially from each other and projecting axially an amount equal to the axial projection of said rim and extending from said rim radially inward to the radially inner portion of the flange, the flange area occupied by said axially projecting rim and fins being greater than the area of said inter-fin spaces on said flange.

2. In combination with a metal pipe having an end including an outer diameter, an inner diameter, an end surface and a radially inward-tapering surface, the improvement comprising an article for protecting the pipe end from deformation by impact as well as from dirt and moisture, the article being formed of plastic material characterized by thermoplastic deformability and comprising a tubular sleeve portion, a taperingly-enlarged portion presented seatedly against the inwardly-tapering surface of the pipe, a flange extending radially outward and presented adjacent to the pipe end surface and terminating in an axially projecting rim whose outer diameter equals that of the pipe, together further with fins spaced tangentially from each other and projecting axially an amount equal to the axial projection of the rim and extending from said rim radially inward to the radially inner portion of the flange.

3. In combination with a metal pipe having an end including an outer diameter, an inner diameter, an end surface, an enlarged end bore portion, a radially inward-tapering surface and V-type threads formed into the inner diameter of the pipe thereadjacent, the improvement comprising an article for protecting the pipe end from deformation by impact as well as from dirt and moisture, the article being formed of plastic material characterized by both elastic and thermoplastic deformability and comprising a tubular cylindrical sleeve portion having an outer diameter larger than the lesser diameter of the pipe threads and having rounded threads at its axially inner end extending radially outward to a diametral extent greater than the lesser diameter of the pipe threads whereby to deform elastically within and against the pipe threads, having at the outer end of said cylindrical sleeve portion a taperingly-enlarged portion presented seatedly against the inwardly-tapering surface of the pipe, thereadjacent having an enlarged-diameter cylindrical portion fitted within the end bore portion of the pipe and extending to its end surface, there having a flange extending from said enlarged cylindrical portion radially outward and presented adjacent to the pipe end surface and terminating in an axially projecting rim whose outer diameter equals that of the pipe and whose inner diameter is greater than the inner diameter of the end bore portion of the pipe, together further with fins spaced tangentially from each other and projecting axially inward an amount equal to the axial projection of said rim and extending from said rim radially inward to the inner diameter of the enlarged cylindrical portion.

References Cited in the file of this patent

UNITED STATES PATENTS

| | | |
|---|---|---|
| 1,674,998 | Spang | June 26, 1928 |
| 2,277,713 | Parker | Mar. 31, 1942 |
| 2,627,877 | Phillips | Feb. 10, 1953 |
| 2,724,463 | Becker | Nov. 22, 1955 |
| 2,826,222 | Case | Mar. 11, 1958 |
| 2,857,510 | Haggerty et al. | Oct. 21, 1958 |